United States Patent
Oh et al.

(10) Patent No.: US 9,475,728 B2
(45) Date of Patent: Oct. 25, 2016

(54) TOUGHENED GLASS FABRICATION METHOD AND TOUGHENED GLASS FABRICATED THEREBY

(71) Applicant: Samsung Corning Precision Materials Co., Ltd., Gyeongsangbuk-do (KR)

(72) Inventors: Sang Yoon Oh, ChungCheongNam-Do (KR); Jong Taek Kim, ChungCheongNam-Do (KR); JiYoung Kim, ChungCheongNam-Do (KR); HwaYeon Lee, ChungCheongNam-Do (KR); Jin Sung Lim, ChungCheongNam-Do (KR)

(73) Assignee: Corning Precision Materials Co., Ltd. (KR)

( * ) Notice: Subject to any disclaimer, the term of this patent is extended or adjusted under 35 U.S.C. 154(b) by 265 days.

(21) Appl. No.: 13/936,475

(22) Filed: Jul. 8, 2013

(65) Prior Publication Data

US 2015/0013389 A1    Jan. 15, 2015

(51) Int. Cl.
*C03C 21/00* (2006.01)

(52) U.S. Cl.
CPC ................ *C03C 21/002* (2013.01)

(58) Field of Classification Search
CPC .... C03C 21/00; C03C 21/008; C03C 21/001
See application file for complete search history.

(56) References Cited

U.S. PATENT DOCUMENTS

| | | | | |
|---|---|---|---|---|
| 3,730,871 A | * | 5/1973 | Boffe | 204/245 |
| 3,843,472 A | * | 10/1974 | Toussaint et al. | 428/192 |
| 3,853,673 A | * | 12/1974 | Levene et al. | 428/427 |
| 4,874,414 A | * | 10/1989 | Kaite et al. | 65/30.13 |
| 4,956,066 A | * | 9/1990 | Froning et al. | 204/247 |
| 2009/0162703 A1 | * | 6/2009 | Kawai | 428/832 |
| 2012/0216570 A1 | * | 8/2012 | Abramov et al. | 65/30.14 |
| 2013/0192305 A1 | * | 8/2013 | Black et al. | 65/30.14 |
| 2015/0044445 A1 | * | 2/2015 | Garner et al. | 428/220 |

* cited by examiner

*Primary Examiner* — Jason L Lazorcik
(74) *Attorney, Agent, or Firm* — Lerner, David, Littenberg, Krumholz & Mentlik, LLP

(57) ABSTRACT

A toughened glass fabrication method in which the productivity of a large toughened glass and the strength variation of the toughened glass can be improved and a toughened glass fabricated thereby. The toughened glass fabrication method includes the steps of mounting jigs on an upper surface and an undersurface of a raw glass such that an injection space through which a gel-type salt mixture is to be injected is defined between each of the jigs and the raw glass, injecting the gel-type salt mixture into the injection spaces, and heat-treating the raw glass on which the jigs are mounted.

8 Claims, 1 Drawing Sheet

(a)　　(b)　　(c)　　(d)

TOUGHENED GLASS FABRICATION METHOD AND TOUGHENED GLASS FABRICATED THEREBY

BACKGROUND OF THE INVENTION

1. Field of the Invention

The present invention relates to a toughened glass fabrication method and a toughened glass fabricated thereby, and more particularly, to a toughened glass fabrication method in which the productivity of a large toughened glass and the strength variation of the toughened glass can be improved and a toughened glass fabricated thereby.

2. Description of Related Art

Recently, the size of glass panels is rapidly increasing as their application is expanding from small mobile articles to large flat display devices, such as a monitor and a TV.

In addition to the increased size, the trend of glass panels is toward a light and thin profile in order to decrease the weight and thickness of glass panels, and studies on a glass toughening method capable of compensating for structural vulnerability resulting from the light and thin profile are also being performed.

The glass toughening method can be generally divided into a physical toughening method and a chemical toughening method. In these methods, the chemical toughening method uses the principle of inducing a compressive stress layer in the surface of a glass panel by ion exchange treatment.

In the chemical toughening method of the related art, the ion exchange treatment supplies ions to glass by dipping the glass into a salt bath which contains a molten salt. Here, the process of exchanging ions between the glass surface and the molten salt is enabled as ions penetrate into the glass dipped in the salt bath by diffusion due to the difference in concentration in the atmosphere having an increased temperature.

However, this toughening method of the related art requires the glass panel to be dipped in the state in which it is erected and fitted into a cassette. This consequently requires the volume of a heat treatment furnace to be increased. When large glass panels are strengthened, the amount becomes restricted as a result of the limited capacity.

In addition, when the toughening method of the related art is performed on a large area, variations may easily occur due to changes in heat, ion concentration or the like that are caused by a minute flow of the solution inside the bath, and non-uniformity in stress or the like may occur due to a stress change in the glass surface, so that the glass is fractured during the chemical toughening process.

The information disclosed in the Background of the Invention section is provided only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a toughened glass fabrication method in which the productivity of a large toughened glass and the strength variation of the toughened glass can be improved and a toughened glass fabricated thereby.

In an aspect of the present invention, provided is a toughened glass fabrication method that includes the following steps of: mounting jigs on an upper surface and an undersurface of a raw glass such that an injection space through which a gel-type salt mixture is to be injected is defined between each of the jigs and the raw glass; injecting the gel-type salt mixture into the injection spaces; and heat-treating the raw glass on which the jigs are mounted.

According to an embodiment of the present invention, the gel-type salt mixture may consist of an alkali metal ion salt and an inorganic oxide.

The alkali metal ion salt may include at least one selected from the group consisting of a nitride, a chloride and a sulfate.

The alkali metal ion salt may be potassium nitrate ($KNO_3$).

The step of heat-treating the raw glass may include heat-treating the raw glass at a temperature ranging from 200 to 740° C.

The toughened glass fabrication method may further include the step of cooling the raw glass after the step of heat-treating the raw glass.

The toughened glass fabrication method may further include the step of removing the jigs from the raw glass and then cleaning the raw glass after the step of cooling the raw glass.

The step of heat-treating the raw glass may include heat-treating the raw glass on which the jigs are mounted in a heating chamber. The raw glass may include a plurality of raw glasses on which the jigs are mounted, the plurality of raw glasses being laid down and stacked on each other inside the heating chamber.

In another aspect of the present invention, provided is a toughened glass fabricated by the above-described fabrication method.

According to embodiments of the invention, it is possible to improve the productivity of a large toughened glass and the strength variation of the toughened glass.

In addition, it is possible to prevent fractures caused by warping that would otherwise occur during ion exchange in the related art.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
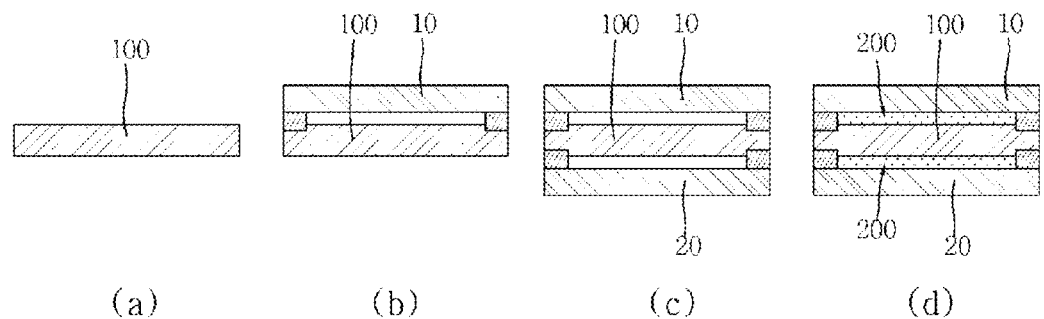
FIG. 1 is a view sequentially showing the process steps of a toughened glass fabrication method according to an embodiment of the present invention.

Reference will now be made in detail to a toughened glass fabrication method and a toughened glass fabricated thereby according to the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

As shown in FIG. 1, the toughened glass fabrication method according to an embodiment of the present invention is the method that can minimize variations in chemical toughening without restrictions in the size of large glass panels, and includes a jig mounting step, an injection step and a heat treatment step.

First, as shown in the part (a) in FIG. 1, a raw glass panel 100 that is to be toughened is prepared. The raw glass panel 100 can be implemented as a soda lime silicate glass. The raw glass panel 100 is applicable as a cover for a photovoltaic cell, a variety of flat panel displays, such as a thin film transistor-liquid crystal display (TFT-LCD), a plasma display panel (PDP) or an organic electroluminescent (EL) device, a variety of mobile electronic devices, and the like.

Afterwards, as shown in the parts (b) and (c) in FIG. 1, at the jig mounting step, an upper jig 10 is mounted on the upper surface of the raw glass panel 100, and a lower jig 20 is mounted on the undersurface of the raw glass panel 100. The upper jig 10 and the lower jig 20 are mounted on the glass panel 100 in order to define injection spaces into which a gel-type mixture 200 can be injected in the subsequent process, to promote an ion exchange reaction by independently positioning a plurality of raw glass panels 100 which are to be stacked in the laid position in order to obtain the spaces at the subsequent heat treatment step, and to facilitate the operation of loading the plurality of raw glass panels 100 into a heating chamber 50 or drawing the plurality of raw glass panels 100 from the heating chamber 50 after the heat treatment. In other words, the upper jig 10 and the lower jig 20 are removed from the raw glass panel 10.

After that, as shown in the part (d) in FIG. 1, at the injection step, a gel-type salt mixture 200 is injected into the spaces which are defined on the upper surface and the undersurface of the raw glass panel 100 by the upper and lower jigs 10 and 20 mounted thereon. When the gel-type salt mixture 200 is used as in this embodiment of the present invention, it is possible to prevent variations in heat and ion concentration that are caused by the flow of a salt solution in the related art, thereby improving variations in strength when the large raw glass panel 100 is chemically toughened. The improved variations in strength can prevent the raw glass panel 100 from being warped and fractured during the toughening process.

The gel-type salt mixture 200 that is injected into the injection spaces at the injection step can consist of an alkali metal ion salt and an inorganic oxide. The alkali metal ion of the alkali metal ion salt can include at least one selected from the group consisting of sodium ion ($Na^+$), potassium ion ($K^+$), rubidium ion ($Rb^+$) and cesium ion ($Cs^+$). In addition, the alkali metal ion salt can include a nitride, a chloride, a sulfate or the like of these alkali metal ions. For example, the alkali metal ion salt can be a cesium nitride ($CsNO_3$), a potassium nitride ($KNO_3$), a sodium nitride ($NaNO_3$) or the like.

The inorganic oxide serves to form a uniform film on the surface of the raw glass panel 100 by carrying the alkali metal ion in the mixture, so that ion exchange can be uniformly performed on the entire surface of glass. Therefore, it is preferred that the inorganic oxide be implemented as a substance having a high softening point since the inorganic oxide is required neither to be chemically decomposed in a temperature condition where the ion exchange occurs between the surface of the raw glass panel 100 and the salt mixture 200 nor to react with the surface of the raw glass panel 100. For example, alumina ($Al_2O_3$) can be used as the inorganic oxide, and the salt mixture 200 is converted into a gel by adjusting the viscosity of this inorganic oxide.

Figure 2:
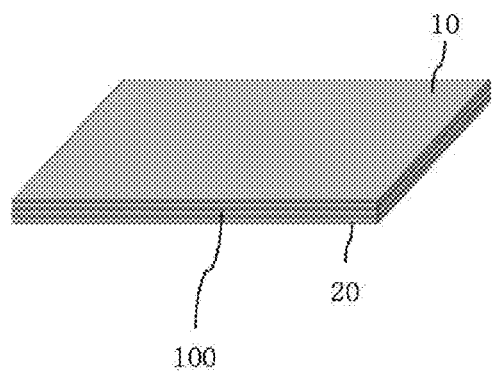
FIG. 2 is a perspective view showing the state in which jigs are mounted on the upper surface and undersurface of a raw glass panel in the toughened glass fabrication method according to an embodiment of the present invention.
Figure 3:
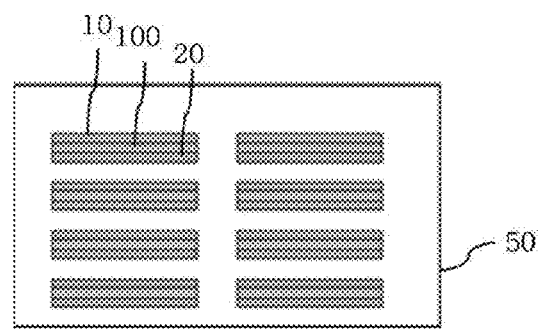
FIG. 3 is a view showing the state in which a plurality of raw glass panels is heat-treated in one heating chamber in the toughened glass fabrication method according to an embodiment of the present invention.

Afterwards, as shown in FIG. 3, at the heat treatment step, the glass panel 100 on which the upper jig 10 and the lower jig are mounted (see FIG. 2) is heat-treated. At the heat treatment step, a plurality of raw glass panels 100 can be loaded into the heating chamber 50 and then be heat-treated at a temperature ranging from 200 to 740° C. According to this embodiment of the present invention, it is possible to more efficiently use the heat treatment space of the heating chamber 50 since the plurality of raw glass panels 100 on which the jigs 10 and 20 are mounted are laid down and stacked on each other inside the heating chamber 50. In other words, more raw glass panels 100 can be concurrently heat-treated than by the related-art method of heat-treating the glass panels which are erected in the cassette. In addition, it is more preferable in terms of the safety of the process to treat the brittle glass panels 100 in the laid position rather than in the erected position during the glass toughening process.

Furthermore, since each raw glass panel 100 is guided by the upper jig 10 and the lower jig 20, it is possible to prevent the raw glass panel 100 from interfering with the upper or lower adjacent raw glass panel, thereby introducing an efficient ion exchange reaction by the heat treatment. In addition, there is an advantage in that an operation can be easily conducted when an operator loads the raw glass panels 100 into the heating chamber 50 or draws the raw glass panels 100 from the heating chamber 50 after the heat treatment.

After the heat treatment step is finished, the raw glass panels 100 are cooled down inside the heating chamber 50, thereby producing toughened glass panels according to an embodiment of the present invention. In addition, it is preferred that a cleaning step of removing the residual mixture from the surface of the toughened glass panels be performed after the upper and lower jigs 10 and 20 are removed from each toughened glass panel. An additional heat treatment process can also be performed as required.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A toughened glass fabrication method comprising:
    mounting jigs on an upper surface and an undersurface of a raw glass such that an injection space through which a salt mixture gel is to be injected is defined between each of the jigs and the raw glass, thereby dispensing with a salt mixture containing bath for dipping the raw glass therein;

injecting the salt mixture gel into the injection spaces; and
heat-treating the raw glass on which the jigs are mounted.

2. The toughened glass fabrication method of claim 1, wherein the salt mixture gel comprises an alkali metal ion salt and an inorganic oxide.

3. The toughened glass fabrication method of claim 2, wherein the alkali metal ion salt comprises at least one selected from the group consisting of a nitride, a chloride and a sulfate.

4. The toughened glass fabrication method of claim 3, wherein the alkali metal ion salt comprises potassium nitrate ($KNO_3$).

5. The toughened glass fabrication method of claim 1, wherein heat-treating the raw glass comprises heat-treating the raw glass at a temperature ranging from 200 to 740° C.

6. The toughened glass fabrication method of claim 1, further comprising cooling the raw glass after heat-treating the raw glass.

7. The toughened glass fabrication method of claim 6, further comprising, after cooling the raw glass, removing the jigs from the raw glass and then cleaning the raw glass.

8. The toughened glass fabrication method of claim 1, wherein heat-treating the raw glass comprises heat-treating the raw glass on which the jigs are mounted in a heating chamber,
   wherein the raw glass comprises a plurality of raw glasses on which the jigs are mounted, the plurality of raw glasses being laid down and stacked on each other inside the heating chamber.

\* \* \* \* \*